United States Patent [19]

Basiulis

[11] 4,337,998
[45] Jul. 6, 1982

[54] VARIABLE TRANSMITTANCE WINDOW

[75] Inventor: Algerd Basiulis, Redondo Beach, Calif.

[73] Assignee: Hughes Aircraft Company, Culver City, Calif.

[21] Appl. No.: 140,528

[22] Filed: Apr. 15, 1980

[51] Int. Cl.³ .................... G02B 5/24; G05D 25/00
[52] U.S. Cl. .................... 350/312; 350/258; 350/267
[58] Field of Search ............. 350/312, 315, 318, 267, 350/258, 260; 126/419, 427

[56] References Cited

U.S. PATENT DOCUMENTS

| | | | |
|---|---|---|---|
| 2,373,214 | 4/1945 | Wolkenhauer | 350/267 |
| 3,368,862 | 2/1968 | Dean | 350/312 |
| 3,675,067 | 7/1972 | Brun | 324/305 |
| 4,236,360 | 12/1980 | Parrier et al. | 350/312 X |

*Primary Examiner*—John K. Corbin
*Assistant Examiner*—Bruce Y. Arnold
*Attorney, Agent, or Firm*—Lewis B. Sternfels; W. H. MacAllister

[57] ABSTRACT

For controlling passage of energy through a variable transmittance window, an enclosure (12) is positioned in the path of the energy. A reservoir (22), saturated with working fluid, is coupled by a conduit (20) to the enclosure. The working fluid is selected to have a property which is capable of affecting passage of the energy through or into the enclosure. By applying or withdrawing heat from the reservoir, working fluid is respectively supplied to, or withdrawn from, the space within enclosure 12. Depending upon the properties of the working fluid, enclosure 12 will operate as an absorber, reflector or transmitter of light or thermal or other energy.

10 Claims, 4 Drawing Figures

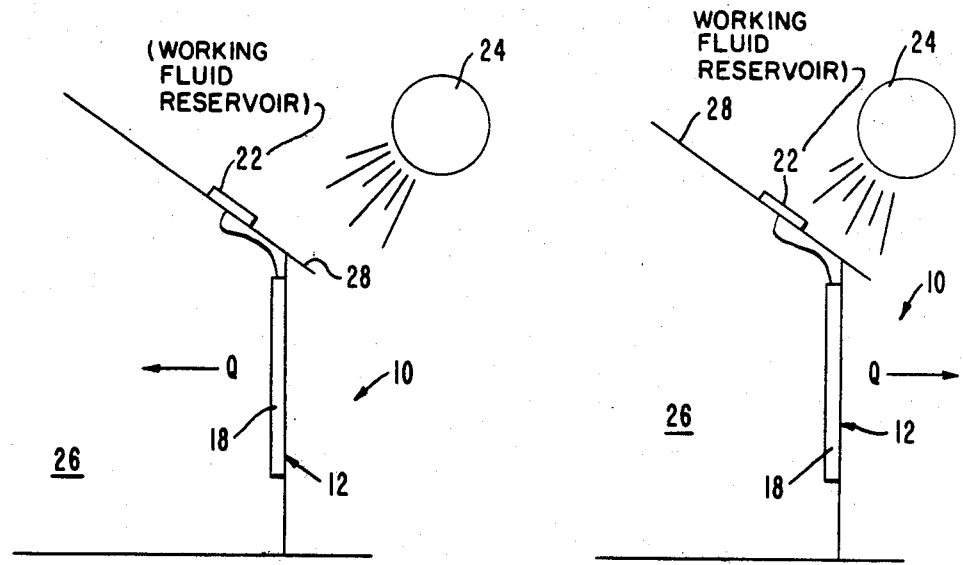
Fig. 2.  Fig. 3.
Fig. 4.
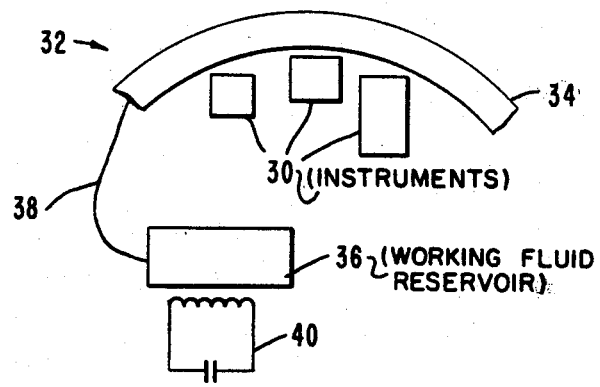

VARIABLE TRANSMITTANCE WINDOW

BACKGROUND OF THE INVENTION

1. Field of the Invention

The present invention relates to a window capable of controlling passage of electromagnetic or thermal energy therethrough, actively or passively, by a heat pipe.

2. Description of the Prior Art

Known prior art for controlling the passage of such energy includes the use of polarized windows, liquid crystals, louvers, fluid transport, particle magnetization and electrification, etc. Examples of fluid placed within a windowed enclosure include U.S. Pat. Nos. 1,780,773 to Wearham, 2,501,418 to Snowden, Jr., 3,188,912 to Wrench, 3,424,515 to Risk, 3,521,946 to Wrench, 3,695,681 to Dockery, 4,044,519 to Morin et al and 4,082,892 to Frump. These devices operate by causing liquids to move the walls of an enclosure or shutters disposed between the walls. Alternatively, liquid is thermally or hydraulically inserted into or withdrawn from an enclosure. Finally, liquid may be left in place, but is selectively colored or tinted. U.S. Pat. Nos. 2,792,752 to Moncreiff-Yeates et al and 3,512,876 to Marks describe electrostatic and magnetic excitation of particles to obstruct the passage of light. U.S. Pat. No. 3,986,769 to Senitzky utilizes the atomic vapor of a material which is chosen for its spectral line to filter a selected spectral line from an incident beam of radiation.

Some problems with this prior art result because it comprises mechanisms which are large and unwieldly or sophisticated and costly which may not be readily flexible to utilize various types of energy.

SUMMARY OF THE INVENTION

The present invention overcomes or avoids these and other problems by combining a hollow window structure with heat pipe technology. The fluid within the hollow window is a working-fluid supplied from a reservoir which actively or passively adds or removes the fluid to or from the space in the window. The type of energy passing through the window dictates the material selection of the specific working fluid, whether reflective, thermally absorptive, etc.

It is, therefore, an object of the present invention to provide for a variable transmittance window amenable to control the passage of varying types of energy.

Another object of the present invention is to provide for such a window which is relatively simple and inexpensive.

Another object of the present invention is to provide for such a window which is easily controllable in an active or a passive manner.

Another object of the present invention is to provide for such a window which is capable of activation and deactivation by the energy it controls.

Other aims and objects as well as a more complete understanding of the present invention will appear from the following explanation of exemplary embodiments and the accompanying drawings thereof.

BRIEF DESCRIPTION OF THE DRAWINGS

FIGS. 2 and 3 are views of the present invention respectively configured to absorb and to reject or reflect heat or energy; and FIG. 4 is a schematic view of a thermal control subsystem utilizing the present invention for use in a space application.

DETAILED DESCRIPTION OF THE INVENTION

Figure 1:
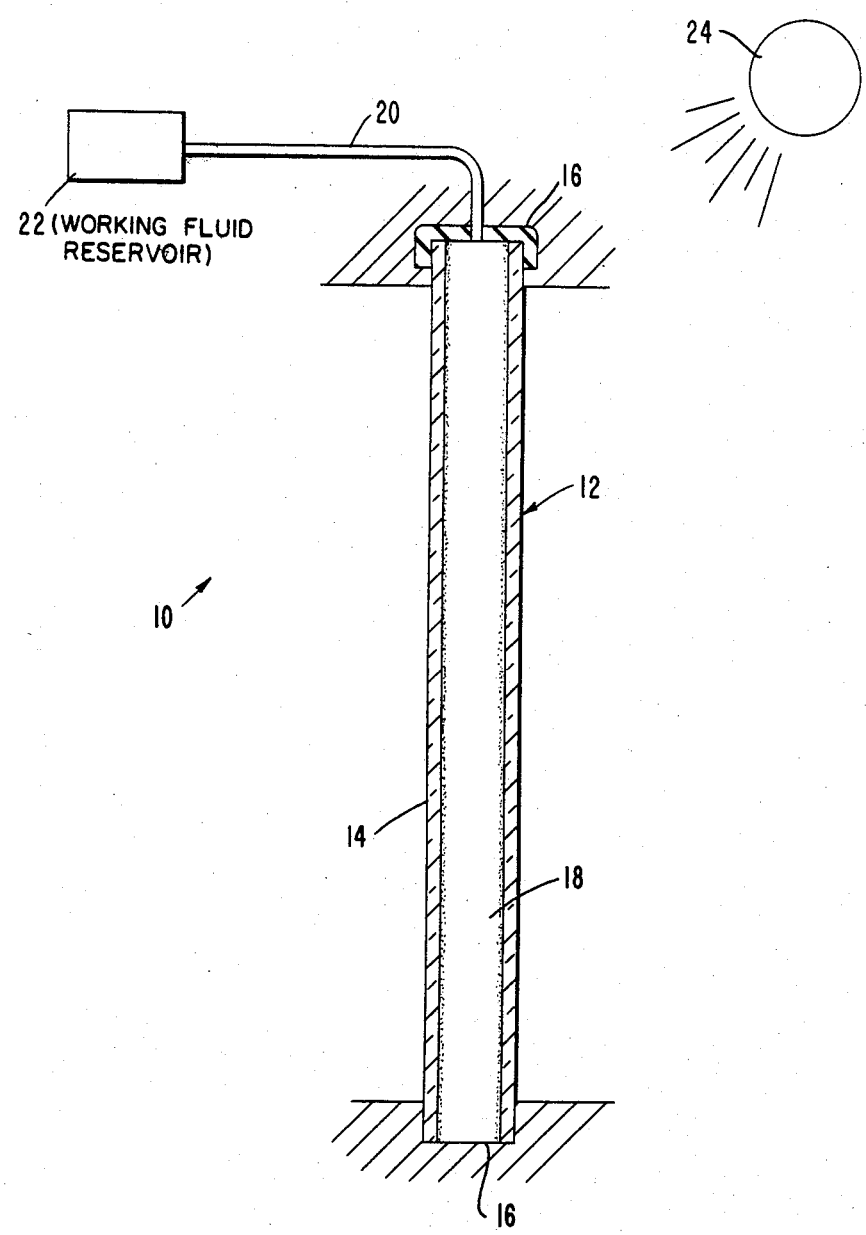
FIG. 1 is a view of a general configuration of the present invention.

Referring to FIG. 1, a variable transmittance window 10, as shown in its basic configuration, is capable of operating as an absorber, reflector, or transmitter of light or thermal energy depending only upon the selected medium used therein. The window comprises an enclosure 12 including essentially a pair of transparent windows 14 spaced closely apart and sealed at their edges 16. Between the windows is a space 18, generally a vacuum space, for receipt of a working fluid vapor. Coupled to window enclosure 12 by a conduit 20 is a reservoir 22, which is saturated with a desired working fluid, as the selected medium.

The working fluid within reservoir 22 is actively or passively heated so that working fluid vapor is driven into space 18, or cooled to withdraw the fluid therefrom. Depending upon the selected working fluid, different transmittance properties of window enclosure 12 can be obtained. For example, if the working fluid is a reflective material, enclosure 12 which ordinarily permits light to pass therethrough without the fluid, will become a reflector. If a working fluid is a good absorber of energy, the window can be used as a solar collector, and by selecting fluid with proper properties, various transmittance properties are attainable. Examples of suitable reflective materials include cesium, mercury, sodium and rubidium, and of partial or full absorbing materials include bromine, iodine, sulfur, water, and various commercially available fluoro-carbons. Other materials suitable for giving different properties may be selected; however, it is an important safety consideration to use materials whose boiling points exceed 300° K. to avoid the occurrance of excessively high pressures.

For example, with respect to FIG. 2, variable transmittance window 10 is used as an absorber. During the heating mode, reservoir 22 is heated, such as by the sun 24 and the space between the windows is filled with the absorbing working fluid vapor. Thermal energy is then transmitted into a living space 26 generally depicted as comprising a habitable dwelling 28. If the day were cloudy, reservoir 22 would cool and condense the fluid, thus removing it from window enclosure 12 to produce at least a partial vacuum in the vapor space. The window enclosure would thus become a good thermal insulator.

FIG. 3 illustrates a similar window; however, here the working fluid is provided with reflective properties. Reservoir 22, as activated by the sun, transmits the working fluid vapor, such as of cesium, which coats one or both windows 14 of enclosure 12 to produce a mirror surface. The enclosure, therefore, will reflect light or thermal energy. Accordingly, it is useful to prevent heating of buildings during summer rather than to add heat as shown in FIG. 2 which is useful for winter operation.

With respect to FIG. 4, the present invention may also be used to protect sensitive instruments 30 within a spacecraft 32 from solar energy or other unwanted energy sources through a variable transmittance window section 34. As before, a working fluid reservoir 36 supplies or withdraws working fluid vapors to or from section 34. It is preferred in this embodiment that there be a separate heater or thermo-electric cooler 40 which operates upon command to furnish working fluid vapor to, or withdraw a vapor from, variable transmittance window section 34.

Accordingly, by cooling a reservoir either actively or passively, working fluid vapor is condensed and the window becomes transparent, and by application of heat, vapor coats the windows in section 34 to reflect energy.

Although the invention has been described with reference to particular embodiments thereof, it should be realized that various changes and modifications may be made therein without departing from the spirit or scope of the invention.

What is claimed is:

1. A variable transmittance window for controlling passage of energy therethrough comprising an enclosure positioned in the path of the energy, a reservoir spaced from said enclosure and containing a working fluid which is capable of being transported to and from the window to vary its transmittance, a transport tube coupled between said enclosure and said reservoir for transporting said working fluid therebetween, and means for applying and withdrawing thermal energy to and from said working fluid to transport it between said reservoir and said enclosure.

2. A variable transmittance window according to claim 1 wherein the energy passable therethrough comprises electromagnetic energy and said working fluid comprises matter capable of reflecting the electromagnetic energy.

3. A variable transmittance window according to claim 2 in which said enclosure forms at least one window of a habitable enclosure for controlling the temperature therein.

4. A variable transmittance window according to claim 2 in which said enclosure forms a window in a spacecraft for protecting heat-sensitive instruments therein.

5. A variable transmittance window for controlling passage of light or thermal energy therethrough comprising an enclosure positioned in the path of the energy and including spaced transparent walls, a reservoir spaced from said enclosure and containing cesium working fluid which is capable of coating said walls to produce mirror surfaces therefrom, a transport tube coupled between said enclosure and said reservoir for transporting said working fluid therebetween, and means for enabling transport of said working fluid to or from said enclosure.

6. A variable transmittance window according to claim 5 in which said enclosure forms at least one window of a habitable enclosure for controlling the temperature therein.

7. A variable transmittance window according to claim 5 in which said enclosure forms a window in a spacecraft for protecting heat-sensitive instruments therein.

8. A variable transmittance window according to claim 7 wherein said working fluid transport enabling means includes a heater and a cooler, respectively for evaporating and for condensing said working fluid.

9. A variable transmittance window for controlling passage of energy therethrough comprising an enclosure positioned in the path of the energy, a reservoir spaced from said enclosure and containing a working fluid which is capable of being transported to and from the window to vary its transmittance, a transport tube coupled between said enclosure and said reservoir for transporting said working fluid therebetween, and means including a heater and a cooler, respectively for evaporating and for condensing said working fluid to enable transport of said working fluid from and to said enclosure.

10. A variable transmittance window for controlling passage of solar energy therethrough comprising an enclosure forming a window to a living space and positioned in the path of the energy, a reservoir spaced from said enclosure and containing a working fluid which is capable of being transported to and from the window to vary its transmittance, a transport tube coupled between said enclosure and said reservoir for transporting said working fluid therebetween whereby, selectively applying the solar energy when available to said reservoir said working fluid is vaporized caused to be transported to said enclosure, thereby permitting the solar energy to be transmitted into said living space, and when the solar energy is not available to said reservoir, said working fluid is condensed and caused to be withdrawn from said enclosure, thereby permitting said enclosure to become a thermal insulator.

* * * * *